United States Patent
Suzuki et al.

(10) Patent No.: US 8,619,551 B2
(45) Date of Patent: Dec. 31, 2013

(54) PROTECTION PATH RESERVATION METHOD AND NODE UNIT

(75) Inventors: Masatoshi Suzuki, Fussa (JP); Hiroyuki Ibe, Yokohama (JP); Tazuko Tomioka, Kawasaki (JP); Kyosuke Dobashi, Higashimurayama (JP); Hiroyuki Inamura, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 872 days.

(21) Appl. No.: 11/651,493

(22) Filed: Jan. 10, 2007

(65) Prior Publication Data

US 2007/0159964 A1    Jul. 12, 2007

(30) Foreign Application Priority Data

Jan. 11, 2006    (JP) .................................. 2006-003920

(51) Int. Cl.
*G01R 31/08* (2006.01)
*G06F 15/173* (2006.01)
*G02F 1/00* (2006.01)

(52) U.S. Cl.
USPC ................ 370/218; 370/242; 709/239; 398/5

(58) Field of Classification Search
USPC ......... 370/216, 218–220, 222, 225, 242, 248, 370/252, 254, 351, 389, 392; 709/220–224, 709/226, 238–239, 243, 251; 398/1–5
See application file for complete search history.

(56) References Cited

U.S. PATENT DOCUMENTS

| | | | | |
|---|---|---|---|---|
| 6,530,032 | B1 * | 3/2003 | Shew et al. | 714/4 |
| 2001/0019554 | A1 * | 9/2001 | Nomura et al. | 370/389 |
| 2002/0176131 | A1 * | 11/2002 | Walters et al. | 359/118 |
| 2003/0147352 | A1 * | 8/2003 | Ishibashi et al. | 370/248 |
| 2005/0220026 | A1 * | 10/2005 | Dziong et al. | 370/237 |
| 2006/0051090 | A1 * | 3/2006 | Saniee et al. | 398/59 |

FOREIGN PATENT DOCUMENTS

| | | |
|---|---|---|
| EP | 1596539 A1 * | 11/2005 |
| JP | 7-226736 | 8/1995 |
| JP | 2003-46545 | 2/2003 |
| JP | 2003-258851 | 9/2003 |
| WO | WO 2004/075494 A1 | 9/2004 |

OTHER PUBLICATIONS

Notice of Reasons for Rejection for Application No. 2006-003920, Japanese Patent Office, mailed Feb. 3, 2009.

(Continued)

*Primary Examiner* — Redentor Pasia
(74) *Attorney, Agent, or Firm* — Finnegan, Henderson, Farabow, Garrett & Dunner, LLP

(57) ABSTRACT

A protection path reservation method which reserves protection paths to avoid a node failure for each transmission path on a network formed of a plurality of nodes, comprising assuming the nodes as an imaginary failure node in turn in a condition in which the node failure is not present in the network, and selecting N neighbor nodes connected to the imaginary failure node through N links, wherein the imaginary failure nodes sequentially transmit protection path reservation request messages to neighbor nodes, and the nodes which have received the protection path reservation request messages sequentially, one by one, reserve N−1 protection paths starting from the nodes.

8 Claims, 6 Drawing Sheets

(56) References Cited

OTHER PUBLICATIONS

Keiko Ohkubo et al., Consideration on Protection Paths Band Sharing in N Paths Protection, technical research report of the Institute of Electronics, Information and Communication Engineers, vol. 102, No. 352, the Institute of Electronics, Information and Communication Engineers, Sep. 23, 2002, pp. 85-88.

Partial European Search Report issued by the European Patent Office on Mar. 22, 2007, for European Patent Application No. 07000316.5.
Notification of Reasons for Rejection, issued by Japanese Patent Office in Japanese Application No. 2006-003920, mailing date Apr. 1, 2008, and English translation thereof.
Kano et al., Fast Fault Recovery Method for Optical Network using GMPLS Architecture, IEICE Technical Report, May 22, 2003, pp. 19-24, vol. 103, No. 67, Japan.

* cited by examiner

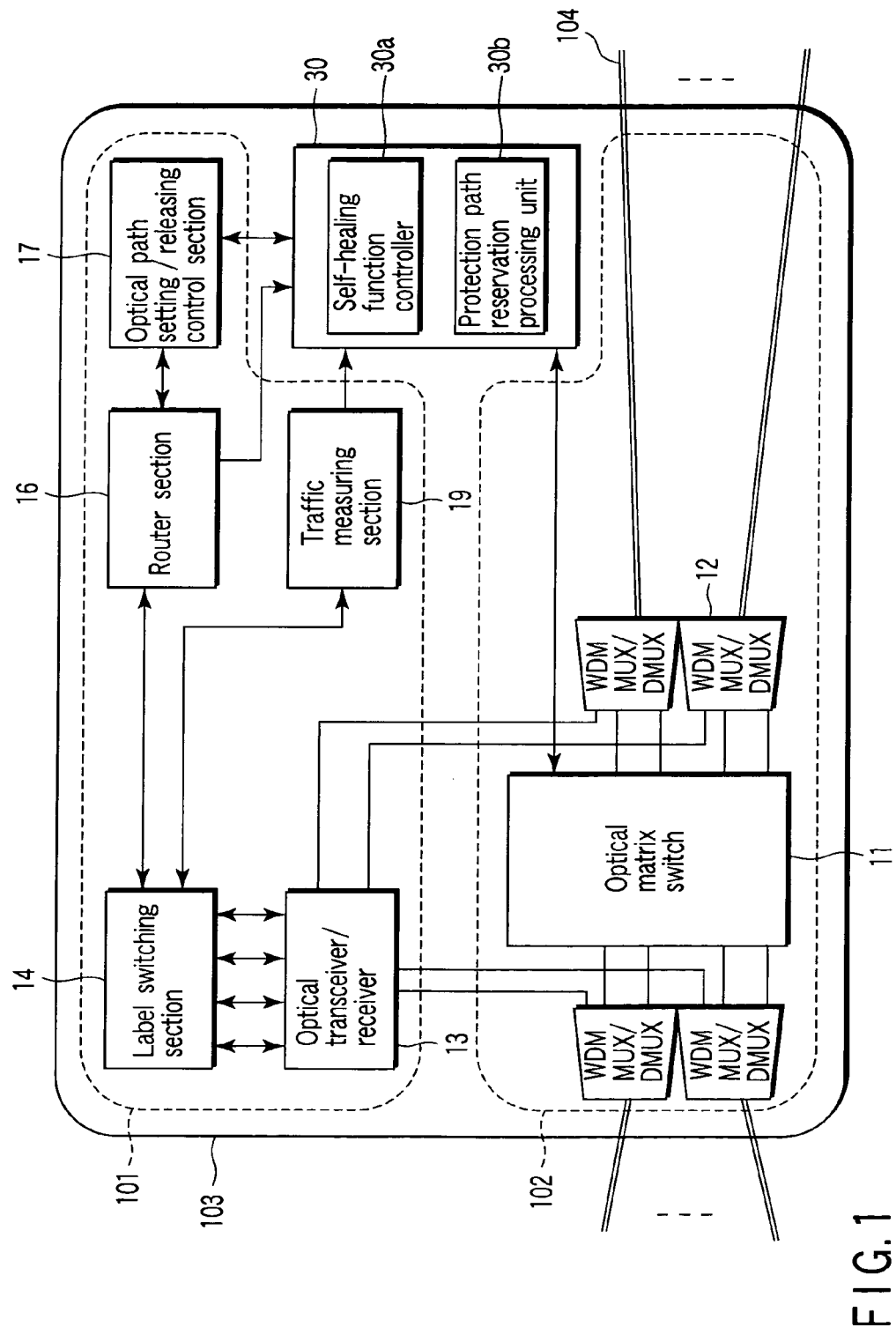
F I G. 1

$m_{xy}$: Protection path reservation message $m_{Ax}$: Reservation request message
$m_{Bx}$: Reservation confirming message

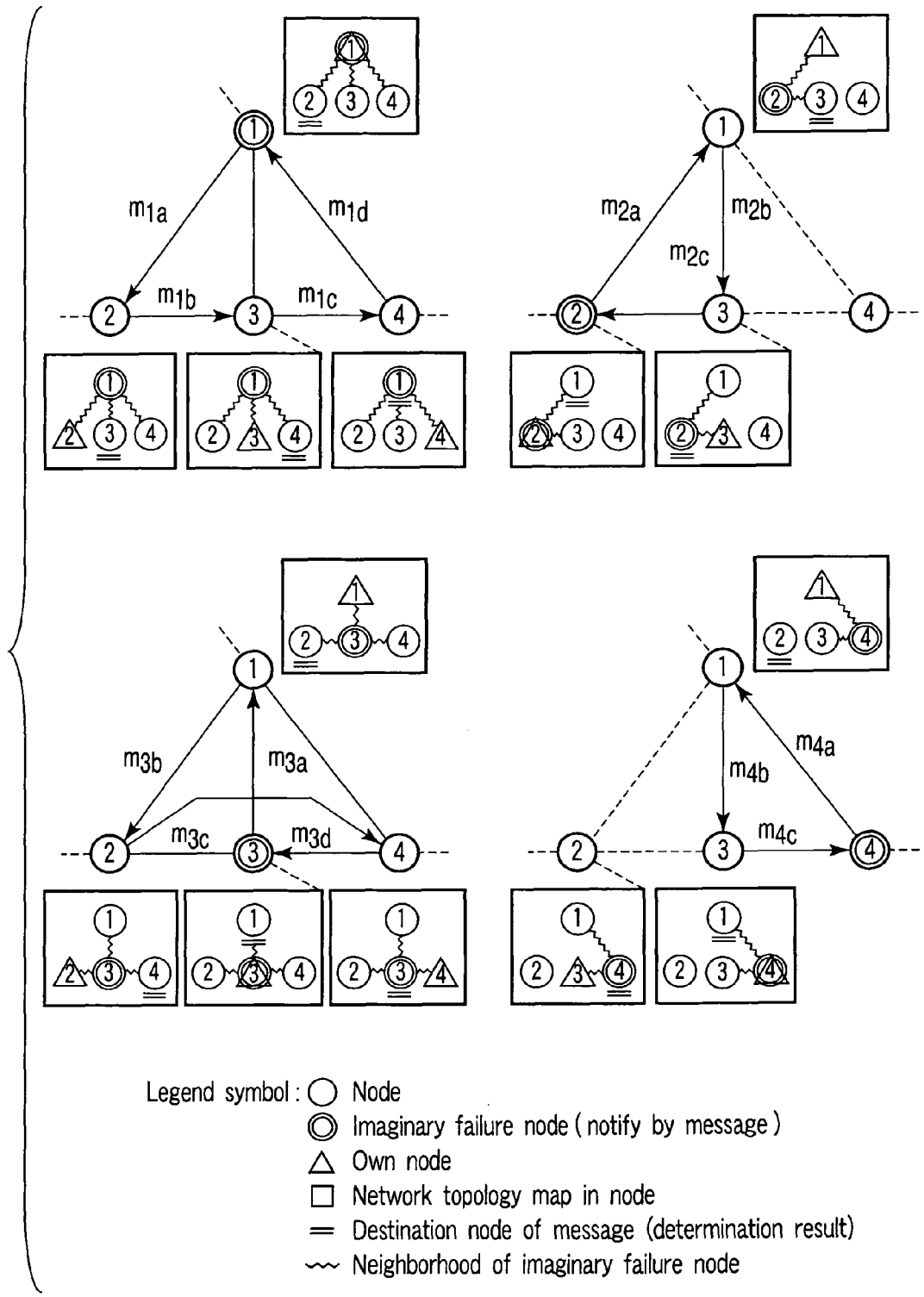
F I G. 6

PROTECTION PATH RESERVATION METHOD AND NODE UNIT

CROSS-REFERENCE TO RELATED APPLICATIONS

This application is based upon and claims the benefit of priority from prior Japanese Patent Application No. 2006-003920, filed Jan. 11, 2006, the entire contents of which are incorporated herein by reference.

BACKGROUND OF THE INVENTION

1. Field of the Invention

The invention relates to a protection path reservation method for use in a transmission system applied to a backbone network, etc. More specifically, the present invention relates to a protection technique protecting a transmission path in an optical transmission system known as an all-optical network from a failure.

2. Description of the Related Art

A recent information transmission system usually connects a plurality of nodes in a mesh-like manner via links to form a mesh network. To allocate a transmission resource of the mesh network to a plurality of communication paths, a method for retrieving an optimum route by means of a routing algorithm has been applied up to now. In recent years, a network has received much attention, wherein the network transparently transmits an optical signal as it is without converting the optical signal into an electrical signal at a node and also without converting its wavelength. Such a network is referred to as an all-optical network, and can provide a plurality of logical bands on the links.

In a network of this type, each transmission path is protected from failures by using protection paths which are set with correspondence to each transmission path. In a dedicated protection system that is one of the systems for protection, dedicated protection paths are assigned to each transmission path. Therefore, the dedicated protection system has to secure transmission bands corresponding to all the protection paths in the network and falls into a difficulty in efficient use of the transmission bands. In comparison to such a system, a shared protection system in which a plurality of protection paths share the same transmission band is superior in band use efficiency.

In the shared protection system, the plurality of protection paths reserve the same band (in a competitive situation), and when a line failure occurs, one protection path among them uses the reserved band. However, an occurrence of a node failure results in that a plurality of protection paths are involved with a relief of traffic. Accordingly, the occurrence of the contention among reservations for bands among the protection paths makes a protection function of no use. That is, the contention among the reservations disables the shared protection system from dealing with the node failure. To achieve protection against the node failure, a mechanism to avoid the contention among the reservations for the using transmission bands is required.

Jpn. Pat. Appln. KOKAI publication No. 2003-258851 discloses a path protection method in a transmission system. However, this reference does not cover the all-optical network.

BRIEF SUMMARY OF THE INVENTION

The present invention is made in accordance with the foregoing situations, and the object thereof is to provide a protection path reservation method and a node unit capable of reserving protection paths prepared for a node failure with no contention among reservations.

According to an aspect of the present invention, there is provided a protection path reservation method which reserves protection paths to avoid a node failure for each transmission path on a network formed of a plurality of nodes, comprising: assuming the nodes as an imaginary failure node in turn in a condition in which the node failure is not present in the network; and selecting N neighbor nodes connected to the imaginary failure node through N links; wherein the imaginary failure nodes sequentially transmit protection path reservation request messages to neighbor nodes; and the nodes which have received the protection path reservation request messages sequentially, one by one, reserve N−1 protection paths starting from the nodes.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary functional block diagram depicting a node unit regarding the invention;

FIG. 6 is an exemplary view depicting one example of a protection path reservation sequence in a third embodiment of the invention;

DETAILED DESCRIPTION OF THE INVENTION

Figure 2:
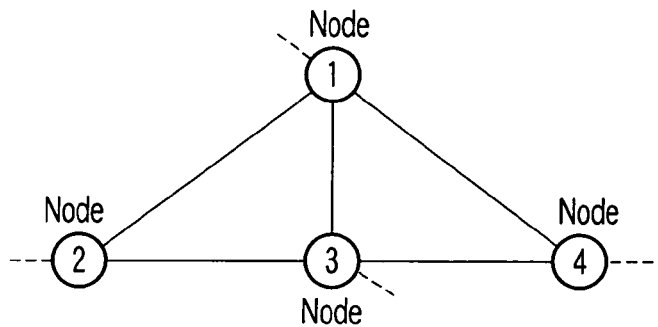
FIG. 2 is an exemplary view depicting an example of an imaginary network in an embodiment of the invention.

Avoidance of the contention among reservations for transmission bands of protection paths in node-failure dealing-protection will be described with reference to the drawings hereinafter. In the following description, a transmission band is referred to as a resource.

FIG. 1 is a functional block diagram showing a node unit regarding the present invention. A node 100 includes a label switching router 101, a photonic cross connect 102, and a control section 30.

The cross connect 102 has an optical matrix switch 11, wavelength multiplexing/demultiplexing MUX/DMUXs (WDM MUX/DMUXs) 12, and the control section 30. For purpose of simplification in FIG. 2, the matrix switch 11 is set as an optical space matrix switch having ten input ports and ten output ports.

It is presumed that the WDM MUX/DMUXs 12 can demultiplex three wavelengths total of wavelengths $\lambda 0$, $\lambda 1$ and $\lambda 2$, and that the wavelength $\lambda 0$ among them is a default wavelength. The matrix switch 11 is assumed to have a function capable of selecting arbitrary ports in the same wavelength. For reasons of the description, the number of wavelengths being set to three, the number of the wavelengths is not limited. The cross connect 102 is connected to different nodes via optical transmission paths 104.

An optical transceiver/receiver 13 in the switching router 101 converts optical signals input/output through the WDM MUX/DMUXs 12 into electrical signals. The electrical signals are switched by the label switching section 14 toward output ports based on label information included in the electrical signals. In usual, the electrical signals input/output to the label switching section 14 are packet data consisting of header parts and variable length data, respectively. Labels with fixed lengths being added to the packet data, it is called a labeled packet. The label switching section 14 needs to refer a label table showing a relationship between label values and output ports so as to select an appropriate output port on the basis of the labeled packet.

The router section 16 has a function as an Internet protocol (IP) router and a function to create the label table. When the node 100 operates as an edge device of a network, the router section 16 is connected to an external network such as an IP network. That is, the router section 16 has a transmitting/receiving function of IP packets to and from the IP network. The neighbor nodes are connected to each other by using, for example, default wavelengths $\lambda 0$.

The label switching section 14 adds the predetermined default labels to the IP packets from the router section 16 to transfer the IP packets to the neighbor nodes. The label switching section 14 with the default label input therein removes the labels from the IP packets to recover those forms to ones of the IP packets then inputs them in the router section 16. A network formed like such a manner may be recognized as an IP router network in which nodes are connected to each other through hop by hop.

According to this configuration, the router section 16 can operate, for instance, a dynamic routing protocol such as an open shortest path first (OSPF). It becomes possible for the router section 16 to automatically prepare a forwarding table in the use of the dynamic routing protocol.

A traffic measuring section 19 measures a data traffic amount which has been measured in the label switching section 14. In particular, it is thought that the label switching section 14 is provided a buffer queue with a unit of label switch path (LSP), and that the measuring section 19 monitors a data amount stored in the queue. Measuring a data traffic amount by using any other method poses no problem.

If the LSPs are established in a full mesh manner, the optical transceiver/receiver 13 inputs packets, passing through the node 100, to the label switching section 14. The packets are double backed (returned) from the label switching section 14 to be transferred to the neighbor node via the optical transceiver/receiver 13. In the situation, when the measuring section 19 observes the data traffic exceeding a prescribed threshold, the measuring section 19 generates a trigger to make a request for setting an optical path. The trigger is applied to an optical path setting/releasing control section 17.

The control section 17 which has received the trigger transmits an optical setting request message to an ingress node of the corresponding LSP. The request message is labeled-packetized by the label switching section 14 though the router section 16, and converted into the optical signal having a wavelength of $\lambda 0$ by the optical transceiver/receiver 13. The request message then achieves the control section 17 of the ingress node of the LSP hop by hop.

The control section 17 of the ingress node of the LSP which has received the request message starts setting processing of the optical paths. For the signaling, a generalized MPLS (G-MPLS) which is made by generally expanding the MPLS may be used. Basically, the control section 17 of the egress node which has received the request message returns an optical path reservation message to the ingress node to switch the optical matrix switch 11 via the control section 30 of an intermediate node though which the optical path passes and of the ingress node.

In the intermediate node of the optical path, the optical matrix switch 11 is provided and the optical signal passes as it is. Therefore, a delay time of a data packet is decided only by a passing time of light. As mentioned above, the node 100 monitors the traffic of the LSP being a default path, and when the node 100 detects a state (for instance, a state in which traffic exceeds a threshold and increases) to make a shift from the LSP to the optical path, the node 100 starts an optical path setting procedure. In a configuration given above, the optical path setting/releasing control section 17, control section 30 and optical matrix switch 11 generate an optical path wherein it is possible to store at least a part of the traffic of the default path.

By the way, the control section 30 is provided with a self-healing function controller 30a, and a protection path reservation processing unit 30b.

The function controller 30a relieves traffic flowing in transmission paths at the links from failures by using the protection paths prepared for the transmission paths. The processing unit 30b conducts signaling among a plurality of node units to determine the routes of the protection paths prepared for the transmission paths.

In the procedures described hereinafter, some of them are conducted by a single node unit, and some of them are conducted by mutual cooperation operations (distribution processing) of a plurality of node units. In the system of this type, many functions are achieved by means of distribution processing among a plurality of nodes. For implementing the distribution processing, signaling is executed among the plurality of nodes. The system achieves the signaling in a manner such that a certain node writes a message at the defined position in the transmission packet and other nodes read the message. That is, the signaling is the processing to communicate the messages among the plurality of nodes.

FIG. 2 is a view showing an example of an imaginary network in an embodiment of the invention. As shown in FIG. 2, four nodes 1-4 are connected in a mesh-like manner. It is presumed that a node "i" is a node (imaginary failure node) in which an occurrence of a failure is imagined. A protection target transmission path is set as $r_{ijk}$. The transmission path $r_{ijk}$ is a path capable of avoiding a failure by using a protection path $r_{ijk}$ of which the ingress node and egress node are set to j and k, respectively.

Table 1 shows an example of paths of the transmission path $r_{ijk}$ and protection path $r_{ijk}$ to be protection targets in the network in FIG. 2. In tale 1, full mesh connection setting is presumed for the protection target transmission paths.

TABLE 1

| $R_{123}$ | 2→1→3 | $r_{123}$ | 2→3 | $R_{312}$ | 1→3→2 | $r_{312}$ | 1→2 |
|---|---|---|---|---|---|---|---|
| $R_{124}$ | 2→1→4 | $r_{124}$ | 2→3→4 | $R_{314}$ | 1→3→4 | $r_{314}$ | 1→4 |
| $R_{132}$ | 3→1→2 | $r_{132}$ | 3→2 | $R_{321}$ | 2→3→1 | $r_{321}$ | 2→1 |
| $R_{134}$ | 3→1→4 | $r_{134}$ | 3→4 | $R_{324}$ | 2→3→4 | $r_{324}$ | 2→1→4 |
| $R_{142}$ | 4→1→2 | $r_{142}$ | 4→3→2 | $R_{341}$ | 4→3→1 | $r_{341}$ | 4→1 |
| $R_{143}$ | 4→1→3 | $r_{143}$ | 4→3 | $R_{342}$ | 4→3→2 | $r_{342}$ | 4→1→2 |
| $R_{213}$ | 1→2→3 | $r_{213}$ | 1→3 | $R_{413}$ | 1→4→3 | $r_{413}$ | 1→3 |
| $R_{231}$ | 3→2→1 | $r_{231}$ | 3→1 | $R_{431}$ | 3→4→1 | $r_{431}$ | 3→1 |

First Embodiment

Figure 3:
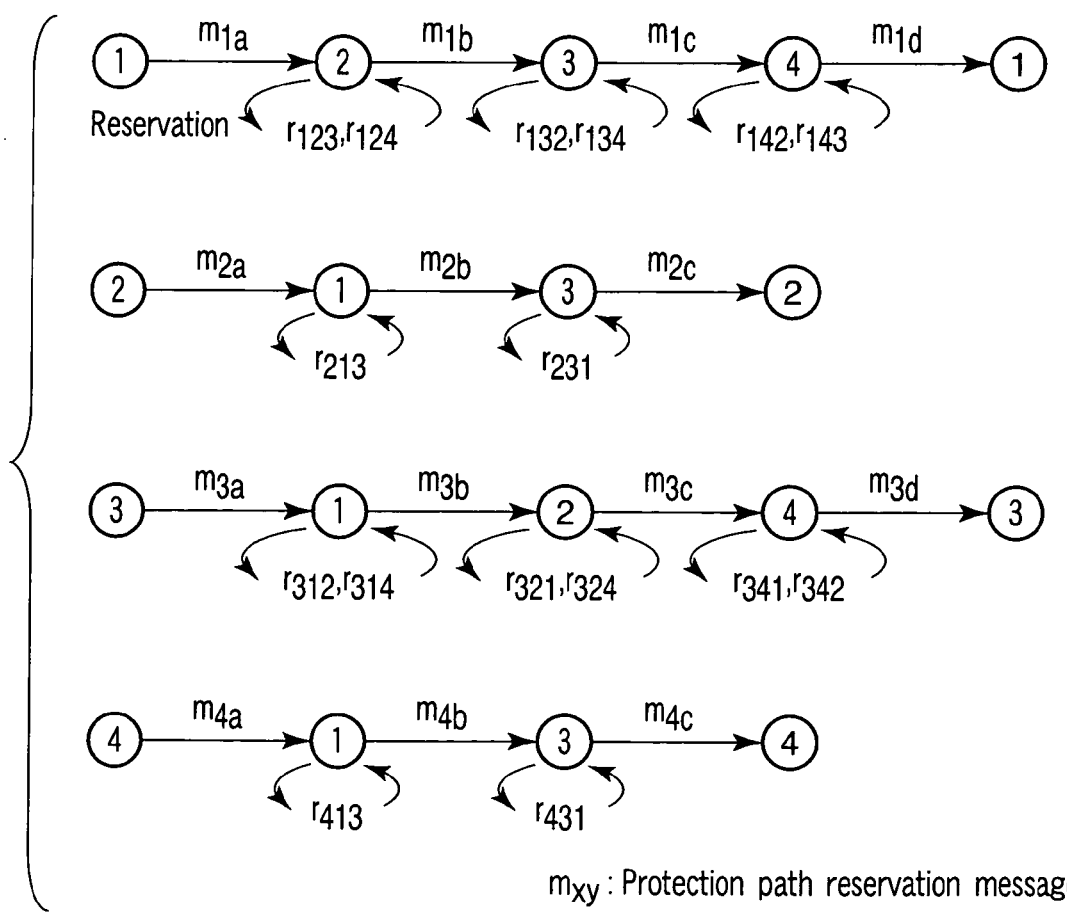
FIG. 3 is an exemplary view depicting one example of a protection path reservation sequence in a first embodiment of the invention.
Figure 4:
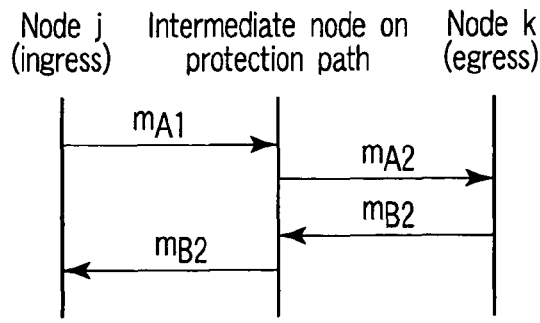
FIG. 4 is an exemplary view depicting a reservation sequence of a protection path $r_{ijk}$.

FIG. 3 is a view showing one example of a protection path reservation sequence in a first embodiment of the invention. In FIG. 3, each $m_{xy}$ indicates a protection path reservation message, which requests for a reservation of a protection path. In the first embodiment, the protection paths the routes of which are shown in Table 1 are sequentially reserved in processes in FIG. 3. In FIG. 3, at first, the node 1 transmits a protection path reservation message $m_{1a}$ to the node 2. The node 2 which has received the message $m_{1a}$ each reserves routes r 123 and 124, and after completing the procedure, then, the node 2 transmits a reservation message $m_{1b}$ to the node 3. The aforementioned procedures can be individually started, for instance, from the nodes 1-4 and perform the processing in parallel. Table 2 shows one example of protection path reservation messages $m_{xy}$. Table 2 shows contents of the protection path reservation messages $m_{xy}$ in FIG. 3. FIG. 4 illustrates a reservation sequence of each protection path $r_{ijk}$.

TABLE 2

| | Message symbol | | | | | | |
|---|---|---|---|---|---|---|---|
| | $m_{1a}$ | $m_{1b}$ | $m_{1c}$ | $m_{1d}$ | $m_{2a}$ | $m_{2b}$ | $m_{2c}$ |
| Destination node ID | 2 | 3 | 4 | 1 | 1 | 3 | 2 |
| Imaginary failure node ID | 1 | 1 | 1 | 1 | 2 | 2 | 2 |
| Ingress node ID list element (0) | 2 | 3 | 4 | — | 1 | 3 | — |
| Ingress node ID list element (1) | 3 | 4 | — | — | 3 | — | — |
| Ingress node ID list element (2) | 4 | — | — | — | — | — | — |
| Egress node ID list element (0) | 2 | 2 | 2 | 2 | 1 | 1 | 1 |
| Egress node ID list element (1) | 3 | 3 | 3 | 3 | 3 | 3 | 3 |
| Egress node ID list element (2) | 4 | 4 | 4 | 4 | — | — | — |

| | Message symbol | | | | | | |
|---|---|---|---|---|---|---|---|
| | $m_{3a}$ | $m_{3b}$ | $m_{3c}$ | $m_{3d}$ | $m_{4a}$ | $m_{4b}$ | $m_{4c}$ |
| Destination node ID | 1 | 2 | 4 | 3 | 1 | 3 | 4 |
| Imaginary failure node ID | 3 | 3 | 3 | 3 | 4 | 4 | 4 |
| Ingress node ID list element (0) | 1 | 2 | 4 | — | 1 | 3 | — |
| Ingress node ID list element (1) | 2 | 4 | — | — | 3 | — | — |
| Ingress node ID list element (2) | 4 | — | — | — | — | — | — |
| Egress node ID list element (0) | 1 | 1 | 1 | 1 | 1 | 1 | 1 |
| Egress node ID list element (1) | 2 | 2 | 2 | 2 | 3 | 3 | 3 |
| Egress node ID list element (2) | 4 | 4 | 4 | 4 | — | — | — |

As illustrated in FIG. 4, according to a sequence based on, for instance, an RSVP-TE (referred to IETF RFC 3209), reservation request message $m_{Ax}$ are sequentially transmitted from an ingress node to an egress node through an intermediate node, and reservation confirming messages $m_{Bx}$ for the request messages $m_{Ax}$ are sent back. Table 3 indicates contents of the reservation request messages and reservation confirming message. Numbers of reservable resources are put in [list elements] of reservation resource information in table 3, respectively.

TABLE 3

| | Message symbol | | | |
|---|---|---|---|---|
| | $m_{A1}$ | $m_{A2}$ | $m_{B1}$ | $m_{B2}$ |
| Reservable resource information [list element (0)] | λ1 | λ1 | | |
| Reservable resource information [list element (1)] | λ2 | λ3 | | |
| Reservable resource information [list element (2)] | λ3 | — | | |
| Reservable resource information [list element (3)] | λ4 | — | | |
| Reservable resource information [list element (4)] | λ5 | — | | |
| Reservable resource information [list element (5)] | — | — | | |
| . | | | | |
| . | | | | |
| Reservable resource information [list element (L)] | — | — | | |
| Reservable resource information | | | λ1 | λ1 |

In the first embodiment, fields each describing imaginary failure node identifications (IDs), protection path ingress node ID lists, and protection path egress node ID lists are defined in the protection path reservation message. The reservation message is transferred from the imaginary failure node to a first (neighbor, ingress) node. For this procedure, the ingress and the egress node ID lists store (neighbor) node IDs from the first to the last in turn, and a destination node is determined as the first node which is at the top of the ingress node ID list.

To transfer the protection path reservation message from the first node to the second node, the reservation sequence erases one top element in the ingress node ID list, and repeats the procedure deciding the destination node as the second node which is at the top of the ingress node ID list.

Moreover, to return the protection path reservation message from the last node to the imaginary failure node, the reservation sequence deletes one top element in the ingress node ID list to determine the destination node as the imaginary failure node because the top element in the ingress node ID list is empty.

Further, in the protection path ingress node to which the protection path reservation message has been transferred, the reservation target protection paths, in which the ingress node and each element in the protection path egress node ID list are combined with one another, are reserved in turn. According to such a sequence, it becomes possible for the node unit to respond to a single node failure of the imaginary failure node (a state of an occurrence of a failure only in the node).

Second Embodiment

Figure 5:
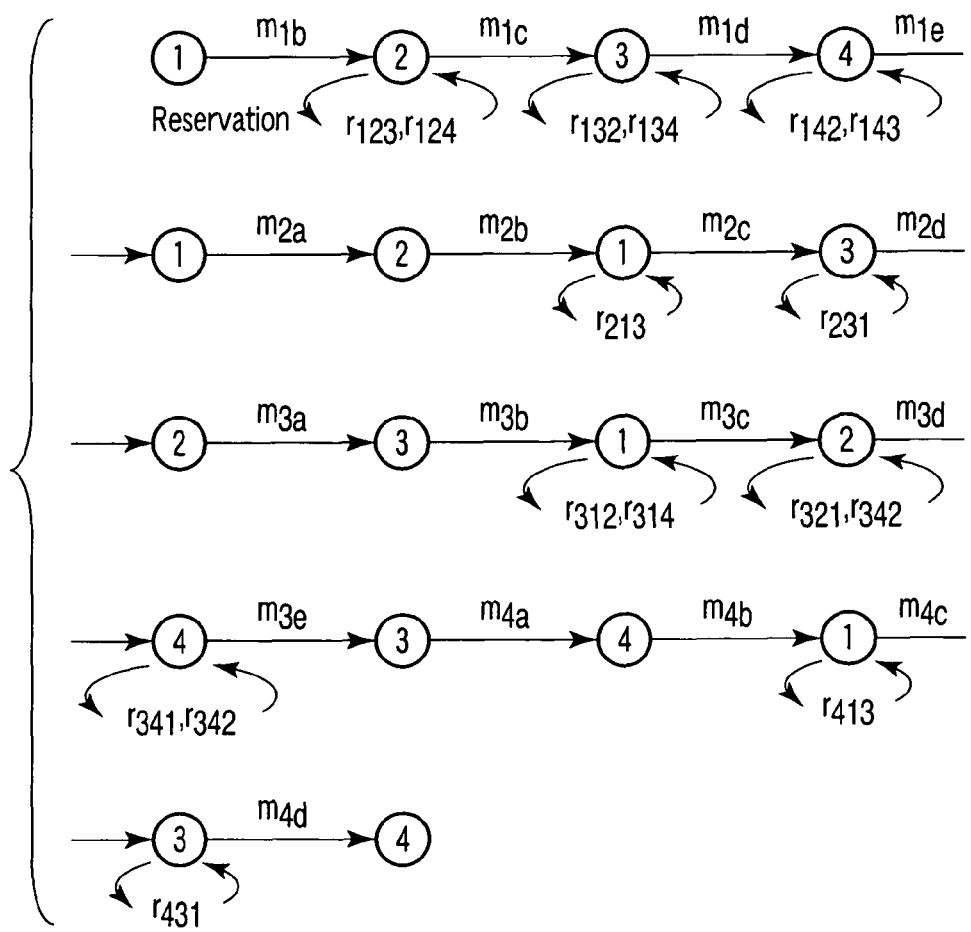
FIG. 5 is an exemplary view depicting one example of a protection path reservation sequence in a second embodiment of the invention.

FIG. 5 is a view illustrating one example of a protection path reservation sequence in a second embodiment of the invention. In the embodiment, processes in FIG. 5 sequentially reserve the protection paths of which the routes are shown in Table 1. In the processes in FIG. 5, the protection path reservation messages are sequentially transferred among each node in accordance with a fixed order like the order of a node 1, node 2, node 3, node 4, node 1, node 2 etc. Table 4 shows contents of the protection path reservation messages in FIG. 5. Contents of the reservation sequence of each protection path, and of the reservation request and reservation confirming messages are similar to those of FIG. 4 and Table 3, respectively.

TABLE 4

| | Message symbol | | | | | | | |
|---|---|---|---|---|---|---|---|---|
| | $m_{1b}$ | $m_{1c}$ | $m_{1d}$ | $m_{1e}$ | $m_{2a}$ | $m_{2b}$ | $m_{2c}$ | $m_{2d}$ |
| Destination node ID | 2 | 3 | 4 | 1 | 2 | 1 | 3 | 2 |
| Imaginary failure node ID list element (0) | 1 | 1 | 1 | 1 | 2 | 2 | 2 | 2 |
| Imaginary failure node ID list element (1) | 2 | 2 | 2 | 2 | 3 | 3 | 3 | 3 |
| Imaginary failure node ID list element (2) | 3 | 3 | 3 | 3 | 4 | 4 | 4 | 4 |
| Imaginary failure node ID list element (3) | 4 | 4 | 4 | 4 | — | — | — | — |
| Ingress node ID list element (0) | 2 | 3 | 4 | — | — | 1 | 3 | — |
| Ingress node ID list element (1) | 3 | 4 | — | — | — | 3 | — | — |
| Ingress node ID list element (2) | 4 | — | — | — | — | — | — | — |
| Egress node ID list element (0) | 2 | 2 | 2 | 2 | — | 1 | 1 | 1 |
| Egress node ID list element (1) | 3 | 3 | 3 | 3 | — | 3 | 3 | 3 |
| Egress node ID list element (2) | 4 | 4 | 4 | 4 | — | — | — | — |

| | Message symbol | | | | | | | | |
|---|---|---|---|---|---|---|---|---|---|
| | $m_{3a}$ | $m_{3b}$ | $m_{3c}$ | $m_{3d}$ | $m_{3e}$ | $m_{4a}$ | $m_{4b}$ | $m_{4c}$ | $m_{4d}$ |
| Destination node ID | 3 | 1 | 2 | 4 | 3 | 4 | 1 | 3 | 4 |
| Imaginary failure node ID list element (0) | 3 | 3 | 3 | 3 | 3 | 4 | 4 | 4 | 4 |
| Imaginary failure node ID list element (1) | 4 | 4 | 4 | 4 | 4 | — | — | — | — |
| Imaginary failure node ID list element (2) | — | — | — | — | — | — | — | — | — |
| Imaginary failure node ID list element (3) | — | — | — | — | — | — | — | — | — |
| Ingress node ID list element (0) | — | 1 | 2 | 4 | — | — | 1 | 3 | — |
| Ingress node ID list element (1) | — | 2 | 4 | — | — | — | 3 | — | — |
| Ingress node ID list element (2) | — | 4 | — | — | — | — | — | — | — |
| Egress node ID list element (0) | — | 1 | 1 | 1 | 1 | — | 1 | 1 | 1 |
| Egress node ID list element (1) | — | 2 | 2 | 2 | 2 | — | 3 | 3 | 3 |
| Egress node ID list element (2) | — | 4 | 4 | 4 | 4 | — | — | — | — |

In the embodiment, fields, in which the imaginary failure node ID list, protection path ingress node ID list, and protection path egress node ID list are each described in the protection path reservation message, are defined. The imaginary failure node ID list stores the protection path reservation messages in which each node ID in the network are described in turn.

To transfer the foregoing reservation message from the first imaginary failure node to the corresponding first (neighbor, ingress) node, the ingress and the egress node ID lists store the node IDs from the corresponding first to the last (neighbor) node IDs in turn. The reservation sequence repeats the procedure to decides the destination node as the first node which is at the top of the ingress node ID list, to delete one top element in the ingress node ID list to transfer the destination node from the first node to the second node, and to determines the destination node as the second node which is at the head of the ingress node ID list.

Further, the reservation sequence erases one top element in the ingress node ID list in order to return the protection path reservation message from the corresponding last node to the first imaginary failure node, and determines the destination node as the first imaginary failure node because the top element of the ingress node ID list is empty. To transfer the protection path reservation message from the first imaginary failure node to the second imaginary failure node, the reservation sequence deletes one of the top elements in the imaginary failure node ID list to make the elements in the ingress and the egress node ID lists empty, and decides the destination node as the second imaginary failure node which is at the head of the imaginary failure node ID list.

Moreover, to transfer the protection path reservation message from the second imaginary failure node to the corresponding first (neighbor, ingress) node, the reservation sequence repeats the procedures to store the node IDS from the first to the last in turn and to decide the destination node as the first node which is at the top of the ingress node ID list.

Furthermore, to return the protection path reservation message from the corresponding last node to the last imaginary failure node, the reservation sequence erases one of the top elements in the ingress node ID list to determine the destination node as the last imaginary failure node that is present at the head of the imaginary failure node ID list because the top element in the ingress node ID list is empty.

According to such a procedure, at the protection path ingress node to which the protection path reservation messages are transferred, the reservation target protection paths, in which the ingress node and each element of the protection path egress node ID lists are combined, become reservable in turn. Even a plurality of node failures of each imaginary failure node are made treatable.

Third Embodiment

In a third embodiment, processes in FIG. 6 sequentially reserve the protection paths of which the routes are indicated in Table 1. That is, each node stores network topology maps in nodes shown in FIG. 6 then comes to know the network topology in advance. Based on the network topology maps in the nodes, each node decides the transmission destinations of the protection path reservation messages.

Each node selects neighbor node on the basis of the network topology, sequentially presumes each selected node as the ingress node of the protection path, assumes the remaining nodes as the egress nodes, assumes the imaginary failure nodes as passing prohibition nodes, and retrieves an optimum arrival route from the ingress node up to the egress node. Table 5 shows the contents of the protection path reservation messages in FIG. 6. Contents of the reservation sequence of each protection path, and of the reservation request and reservation confirming messages are similar to those of FIG. 4 and Table 3, respectively.

TABLE 5

| | Message symbol | | | | | | |
|---|---|---|---|---|---|---|---|
| | $m_{1a}$ | $m_{1b}$ | $m_{1c}$ | $m_{1d}$ | $m_{2a}$ | $m_{2b}$ | $m_{2c}$ |
| Destination node ID | 2 | 3 | 4 | 1 | 1 | 3 | 2 |
| Imaginary failure node ID | 1 | 1 | 1 | 1 | 2 | 2 | 2 |

| | Message symbol | | | | | | |
|---|---|---|---|---|---|---|---|
| | $m_{3a}$ | $m_{3b}$ | $m_{3c}$ | $m_{3d}$ | $m_{4a}$ | $m_{4b}$ | $m_{4c}$ |
| Destination node ID | 1 | 2 | 4 | 3 | 1 | 3 | 4 |
| Imaginary failure node ID | 3 | 3 | 3 | 3 | 4 | 4 | 4 |

In the embodiment, information of the imaginary failure node ID is defined in the protection path reservation message. To transfer the protection path reservation message from the imaginary failure node to the first (neighbor, ingress) node, the reservation sequence determines the destination node, being the result of obtaining the neighbor node next to the imaginary failure node from each item of information of IDs of the network topology, the imaginary failure node ID and the ID of the corresponding node (imaginary failure node) itself, as the first node.

To transfer the protection path reservation message from the first node to the second node, the reservation sequence repeats the procedure to decide the destination node, resulted in requesting the next neighbor node for the imaginary failure node from each information on the network topology, the imaginary failure node ID, and the ID of the corresponding node (first node) itself, as the second node.

To return the protection path reservation message from the last node to the imaginary failure node, if the requesting the next neighbor node for the imaginary failure node from each information on the network topology, imaginary failure node ID, and the ID of the corresponding node (last node) itself resulted in no existence of the corresponding node, the destination node is determined as the imaginary failure node. In this way, in the protection path ingress node to which the protection path reservation message is transferred, the reservation sequence reserve in turn, the reservation target protection paths, in which the other each node (namely, each egress node) neighboring to the imaginary failure nodes obtained from the information on the network topology, imaginary failure node ID, and ID of the corresponding (ingress) node itself are combined with the ingress node, and thereby, it becomes possible to respond the single node failure of the imaginary failure node.

Fourth Embodiment

Figure 7:
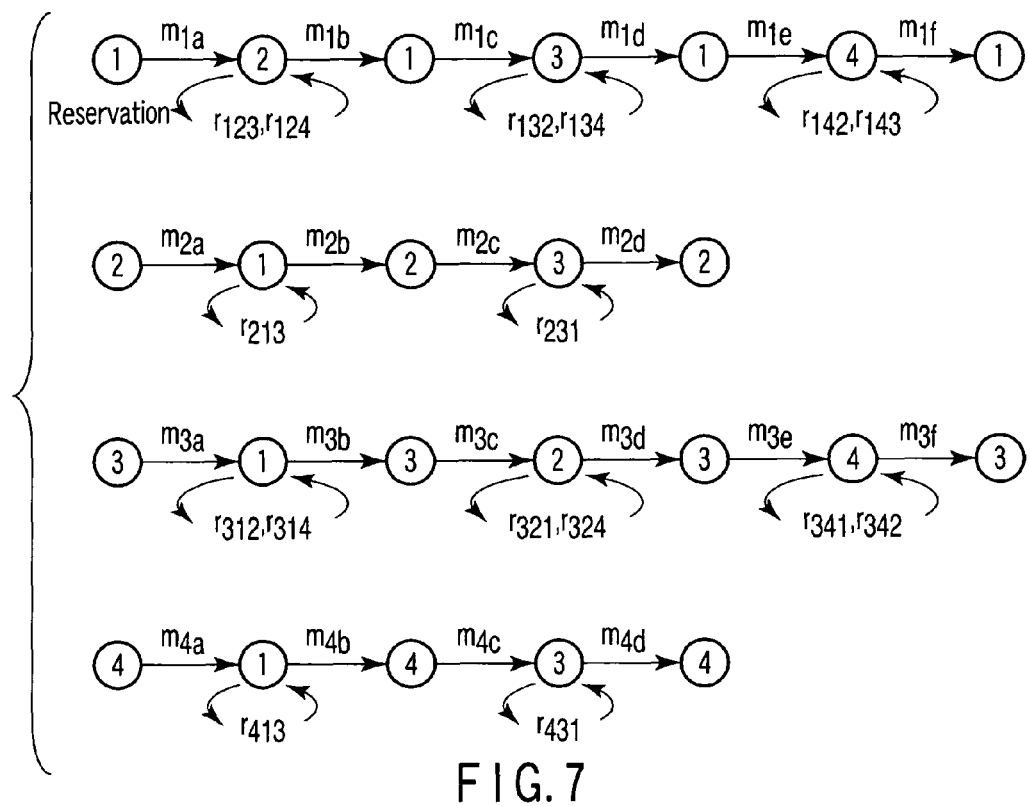
FIG. 7 is an exemplary view depicting one example of a protection path reservation sequence in a fourth embodiment of the invention.

In a fourth embodiment, processes in FIG. 7 reserve in turn the protection paths of which the routes are indicated in Table 1. Table 6 shows the contents of the protection path reservation messages in FIG. 7. Contents of the reservation sequence of each protection path, and of the reservation request and reservation confirming messages are similar to those of FIG. 4 and Table 3, respectively.

TABLE 6

| | Message symbol | | | | | | | | | |
|---|---|---|---|---|---|---|---|---|---|---|
| | $m_{1a}$ | $m_{1b}$ | $m_{1c}$ | $m_{1d}$ | $m_{1e}$ | $m_{1f}$ | $m_{2a}$ | $m_{2b}$ | $m_{2c}$ | $m_{2d}$ |
| Destination node ID | 2 | 1 | 3 | 1 | 4 | 1 | 1 | 2 | 3 | 2 |
| Imaginary failure node ID | 1 | 1 | 1 | 1 | 1 | 1 | 2 | 2 | 2 | 2 |
| Ingress node ID list element (0) | 2 | 2 | 3 | 3 | 4 | 4 | 1 | 1 | 3 | 3 |
| Ingress node ID list element (1) | 3 | 3 | 4 | 4 | — | — | 3 | 3 | — | — |
| Ingress node ID list element (2) | 4 | 4 | — | — | — | — | — | — | — | — |
| Egress node ID list element (0) | 2 | 2 | 2 | 2 | 2 | 2 | 1 | 1 | 1 | 1 |
| Egress node ID list element (1) | 3 | 3 | 3 | 3 | 3 | 3 | 3 | 3 | 3 | 3 |
| Egress node ID list element (2) | 4 | 4 | 4 | 4 | 4 | 4 | — | — | — | — |

| | Message symbol | | | | | | | | | |
|---|---|---|---|---|---|---|---|---|---|---|
| | $m_{3a}$ | $m_{3b}$ | $m_{3c}$ | $m_{3d}$ | $m_{3e}$ | $m_{3f}$ | $m_{4a}$ | $m_{4b}$ | $m_{4c}$ | $m_{4d}$ |
| Destination node ID | 1 | 3 | 2 | 3 | 4 | 3 | 1 | 4 | 3 | 4 |
| Imaginary failure node ID | 3 | 3 | 3 | 3 | 3 | 3 | 4 | 4 | 4 | 4 |
| Ingress node ID list element (0) | 1 | 1 | 2 | 2 | 4 | 4 | 1 | 1 | 3 | 3 |
| Ingress node ID list element (1) | 2 | 2 | 4 | 4 | — | — | 3 | 3 | — | — |
| Ingress node ID list element (2) | 4 | 4 | — | — | — | — | — | — | — | — |
| Egress node ID list element (0) | 1 | 1 | 1 | 1 | 1 | 1 | 1 | 1 | 1 | 1 |
| Egress node ID list element (1) | 2 | 2 | 2 | 2 | 2 | 2 | 3 | 3 | 3 | 3 |
| Egress node ID list element (2) | 4 | 4 | 4 | 4 | 4 | 4 | — | — | — | — |

In the embodiment, the protection path reservation message includes the information relating to the imaginary failure node IDs, protection path ingress node ID list, and protection path egress node ID list. To transfer the protection path reservation message from the imaginary failure node to the first (neighbor, ingress) node, the ingress and egress node ID lists store the node IDs from the first to the last (neighbor) nodes in turn to decide the destination node as the first node which is at the top of the ingress node ID list. To return the protection path reservation message from the first node to the second node, the destination node is determined as the imaginary failure node. Then, to transfer the destination node from the imaginary failure node to the second node, one of the head elements in the ingress node ID list is deleted to decide the destination node as the second node which is at the top of the ingress node ID list. To once return the protection path reservation message from the second node to the imaginary failure node, the procedure to decide the destination node as the imaginary failure node is repeated. Further, to transfer the protection path reservation message from the imaginary failure node to the last node, the reservation sequence deletes one head element in the ingress node ID list to determine the destination node as the last node which is at the top of the ingress node ID list. Moreover, to return the protection path reservation message from the last node to the imaginary failure node, the reservation sequence decides the destination node as the imaginary failure node, deletes one head element in the ingress node ID list (at the imaginary failure node which has received the messages), and terminates the transmission of the messages because the head element in the ingress node ID list is empty.

According to such procedures, in the protection path ingress node to which the protection path reservation message has been transferred, the node unit can reserve in turn the reservation target protection paths in which the ingress nodes are combined with each element in the protection path egress node ID lists, thereby, it becomes possible for the node unit to respond the single node failure of the imaginary failure node.

Fifth Embodiment

Figure 8:
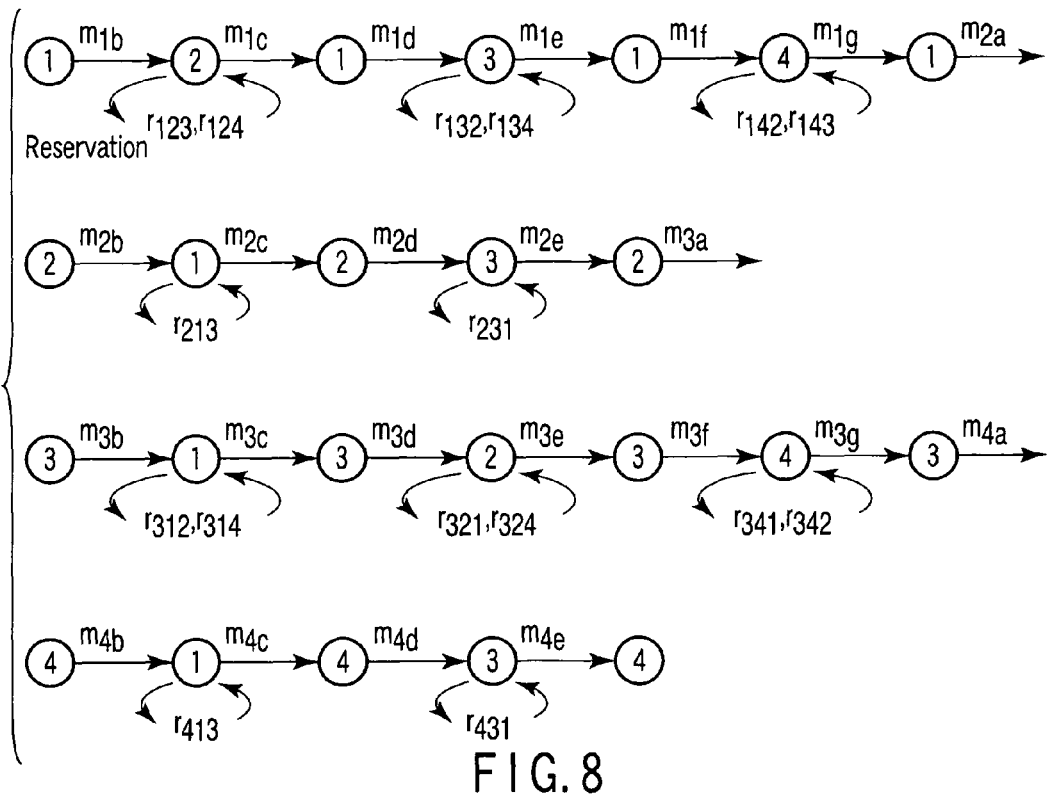
FIG. 8 is an exemplary view depicting one example of a protection path reservation sequence in a fifth embodiment of the invention.

In a fifth embodiment, processes shown in FIG. 8 make reservation in turn for the protection paths of which the routes are indicated in Table 1. Table 7 shows contents of protection path reservation messages in FIG. 8. Contents of the reservation sequence of each protection path, and of the reservation request and reservation confirming messages are the same as those of FIG. 4 and Table 3, respectively.

TABLE 7

| | Message symbol | | | | | | | | | | |
|---|---|---|---|---|---|---|---|---|---|---|---|
| | $m_{1b}$ | $m_{1c}$ | $m_{1d}$ | $m_{1e}$ | $m_{1f}$ | $m_{1g}$ | $m_{2a}$ | $m_{2b}$ | $m_{2c}$ | $m_{2d}$ | $m_{2e}$ |
| Destination node ID (0) | 2 | 1 | 3 | 1 | 4 | 1 | 2 | 1 | 2 | 3 | 2 |
| Imaginary failure node ID list element (0) | 1 | 1 | 1 | 1 | 1 | 1 | 2 | 2 | 2 | 2 | 2 |
| Imaginary failure node ID list element (1) | 2 | 2 | 2 | 2 | 2 | 2 | 3 | 3 | 3 | 3 | 3 |
| Imaginary failure node ID list element (2) | 3 | 3 | 3 | 3 | 3 | 3 | 4 | 4 | 4 | 4 | 4 |
| Imaginary failure node ID list element (3) | 4 | 4 | 4 | 4 | 4 | 4 | — | — | — | — | — |
| Ingress node ID list element (0) | 2 | 2 | 3 | 3 | 4 | 4 | — | 1 | 1 | 3 | 3 |
| Ingress node ID list element (1) | 3 | 3 | 4 | 4 | — | — | — | 3 | 3 | — | — |
| Ingress node ID list element (2) | 4 | 4 | — | — | — | — | — | — | — | — | — |
| Egress node ID list element (0) | 2 | 2 | 2 | 2 | 2 | 2 | — | 1 | 1 | 1 | 1 |
| Egress node ID list element (1) | 3 | 3 | 3 | 3 | 3 | 3 | — | 3 | 3 | 3 | 3 |
| Egress node ID list element (2) | 4 | 4 | 4 | 4 | 4 | 4 | — | — | — | — | — |

| | Message symbol | | | | | | | | | | | |
|---|---|---|---|---|---|---|---|---|---|---|---|---|
| | $m_{3a}$ | $m_{3b}$ | $m_{3c}$ | $m_{3d}$ | $m_{3e}$ | $m_{3f}$ | $m_{3g}$ | $m_{4a}$ | $m_{4b}$ | $m_{4c}$ | $m_{4d}$ | $m_{4e}$ |
| Destination node ID (0) | 3 | 1 | 3 | 2 | 3 | 4 | 3 | 4 | 1 | 4 | 3 | 4 |
| Imaginary failure node ID list element (0) | 3 | 3 | 3 | 3 | 3 | 3 | 3 | 4 | 4 | 4 | 4 | 4 |
| Imaginary failure node ID list element (1) | 4 | 4 | 4 | 4 | 4 | 4 | 4 | — | — | — | — | — |
| Imaginary failure node ID list element (2) | — | — | — | — | — | — | — | — | — | — | — | — |
| Imaginary failure node ID list element (3) | — | — | — | — | — | — | — | — | — | — | — | — |
| Ingress node ID list element (0) | — | 1 | 1 | 2 | 2 | 4 | 4 | — | 1 | 1 | 3 | 3 |
| Ingress node ID list element (1) | — | 2 | 2 | 4 | 4 | — | — | — | 3 | 3 | — | — |
| Ingress node ID list element (2) | — | 4 | 4 | — | — | — | — | — | — | — | — | — |
| Egress node ID list element (0) | — | 1 | 1 | 1 | 1 | 1 | 1 | — | 1 | 1 | 1 | 1 |
| Egress node ID list element (1) | — | 2 | 2 | 2 | 2 | 2 | 2 | — | 3 | 3 | 3 | 3 |
| Egress node ID list element (2) | — | 4 | 4 | 4 | 4 | 4 | 4 | — | — | — | — | — |

In the embodiment, the protection path reservation message includes the information relating to the imaginary failure node ID list, protection path ingress node ID list, and protection path egress node ID list. The imaginary failure node ID list stores each node ID on the network in turn. To transfer the protection path reservation message from the first imaginary failure node to the corresponding first (neighbor, ingress) node, the ingress and egress node ID lists store the node IDs from the first to the last (neighbor) nodes in turn to decide the destination node as the first node which is at the top of the ingress node ID list. To return the protection path reservation message from the first node to the first imaginary failure node once, the destination node is determined as the first imaginary failure node which is at the top in the imaginary failure node ID list. To transfer the protection path reservation message from the first imaginary failure node to the corresponding second node, one of the head elements in the ingress node ID list is deleted to decide the destination node as the second node which is at the top of the ingress node ID list. To once return the protection path reservation message from the corresponding second node to the first imaginary failure node, the procedure to decide the destination node as the first imaginary failure node which is at the top in the imaginary failure node ID list is repeated.

Further, to transfer the protection path reservation message from the first imaginary failure node to the corresponding last node, the reservation sequence deletes one head element in the ingress node ID list to determine the destination node as the last node which is at the top of the ingress node ID list. Then, to return the protection path reservation message from the corresponding last node to the first imaginary failure node, the reservation sequence decides the destination node as the first imaginary failure node which is at the top of the imaginary failure node ID list.

To transfer the protection path reservation message from the first imaginary failure node to the second imaginary failure node, one head element in the ingress node ID list is erased; one head element in the imaginary failure node ID list is deleted because the top element in the ingress node ID list is empty. Then, the elements in the ingress and egress node ID lists are mage empty, and the destination node is determined as the second node which is at the top in the imaginary failure node ID list.

To transfer the protection path reservation message from the second imaginary failure node to the corresponding first (neighbor, ingress), the ingress and egress node ID lists store the node IDs in turn from the corresponding first node to the last node to decide the destination node as the first imaginary failure node which is at the top in the ingress node ID list. To once return the protection path reservation message from the corresponding first node to the second imaginary failure node, the procedure to determine the destination node as the second imaginary failure node which is at the top in the imaginary failure node ID list is repeated.

Furthermore, to transfer the protection path reservation message from the last imaginary failure node to the corresponding last node, one head element in the ingress node ID list is deleted, and the destination node is determined as the last node which is at the top in the ingress node ID list. To return the protection path reservation message from the corresponding last node to the last imaginary failure node, the destination node is determined as the last imaginary failure node which is at the top of the imaginary failure node ID list.

Then, the last imaginary failure node to which the reservation message has been received erases one head element in the ingress node ID, and because the head element in the ingress node ID list is empty, the last imaginary failure node erases one head element in the imaginary failure node ID list to terminate transmissions of messages because the head element in the imaginary failure node ID list is empty.

According to such a procedure, in the protection path ingress node to which the protection path reservation message has been transferred, the node unit can sequentially make reservations for the reservation target protection paths in which the ingress nodes are combined with each element of the protection path egress node ID lists, and it becomes possible to respond even to a plurality of node failures of each imaginary failure node. Like the description given above, according to each embodiment mentioned above, it becomes possible to provide a protection path reservation method capable of reserving the protection paths prepared for the node failures without contentions among bands.

The summary of the descriptions given above is as follows. That is to say, according to the present invention, "a reservation mechanism to determine a plurality of protection paths corresponding to a certain node failure, one by one, in turn (sequentially) so that any contention will not occur in a resource in use, and to make reservations for them (in advance)" is provided for a transmission system.

With making reservations for the protection paths in advance, a shared protection system becomes applicable. It becomes possible to shorten the protection execution time in the occurrence of a failure and to reduce the affect on traffic passing though the protection target transmission path. Accordingly, it becomes possible for the node unit to reserve the protection paths each preparing for the node failure without occurring contentions among bands.

Figure 9:
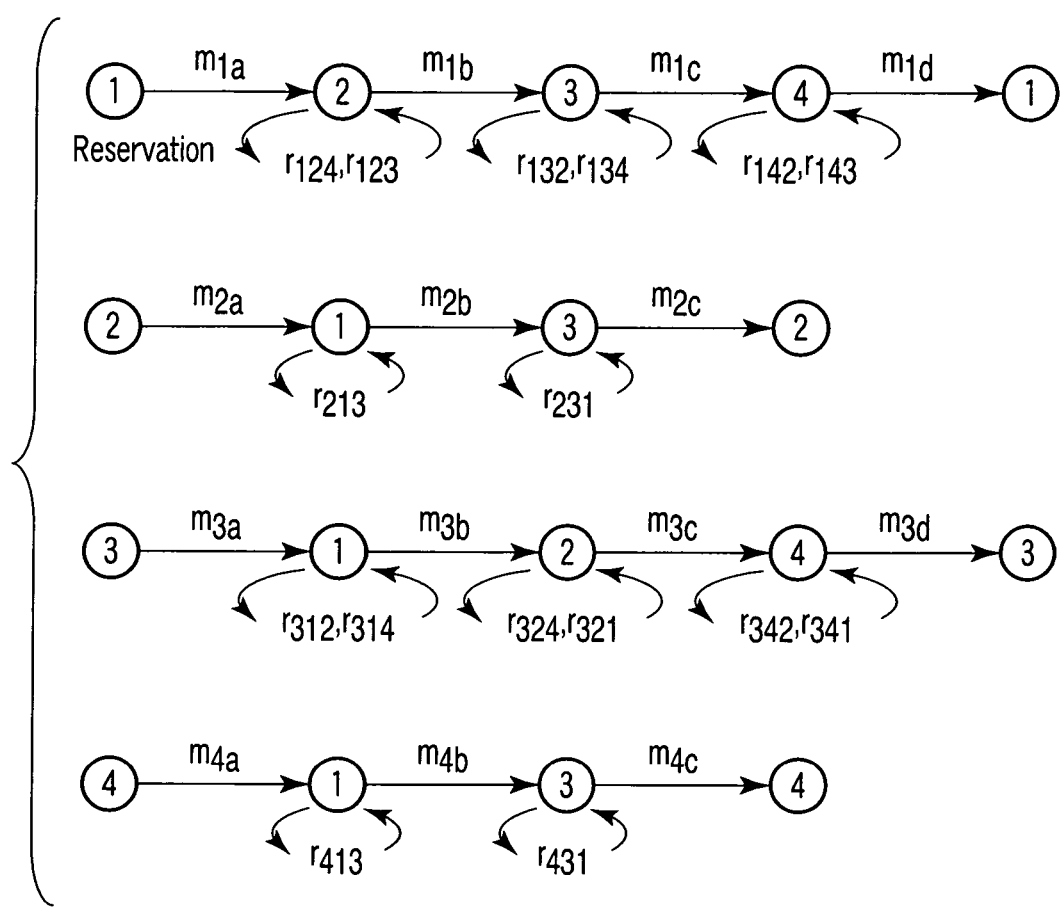
FIG. 9 is an exemplary view depicting other example of a protection path reservation sequence regarding the invention.

The invention is not limited to the aforementioned embodiments as they are. For example, in the protection paths r 123 and r 124 in the first embodiment, the reservation order have been set to the order from the paths r 123 to r 124 in accordance with the order of the node IDs in FIG. 3. Operating from the longer paths in the order from the paths r 124 to r 123 makes it possible to reduce "resources" which have generated among each node on the network, and to improve resource use efficiency. FIG. 9 illustrates an example of the setting sequence of the protection paths depending on such a procedure. FIG. 9 shows a procedure to reserve the protection paths in descending order of length of paths or in descending order of routing cost thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A protection path reservation method which reserves protection paths to avoid a node failure for each optical transmission path on an all-optical network formed of a plurality of nodes, the method comprising:
assuming, by a protection path reservation processing unit, each of the nodes in turn as an imaginary failure node in a condition in which the node failure is not present in the all-optical network; and
selecting, by the protection path reservation processing unit, N neighbor nodes connected to the imaginary failure node through N links;
wherein the all-optical network transparently transmits an optical signal without converting the optical signal into an electrical signal at a node and also without converting a wavelength of the optical signal;
wherein the imaginary failure node sequentially transmits protection path reservation request messages to only the N neighbor nodes of the imaginary failure node; and
each of the N neighbor nodes which has received the protection path reservation request messages sequentially, one by one, reserves N−1 protection paths starting from the nodes in descending order of length.

2. The method according to claim 1, wherein the nodes which have received the protection path reservation request messages reserve the protection paths by means of signaling of the reservation messages based on the RSVP-TE (IETF RFC 3209).

3. The method according to claim 2, further comprising:
storing reservable resource information in the reservation messages to prevent resources which have reserved to the imaginary failure nodes from being reserved again to other protection paths corresponding to relevant the node failure.

4. A protection path reservation method which reserves protection paths to avoid a node failure for each optical transmission path on an all-optical network formed of a plurality of nodes, the method comprising:
assuming, by a protection path reservation processing unit, each of the nodes in turn as an imaginary failure node in a condition in which the node failure is not present in the all-optical network;
selecting, by the protection path reservation processing unit, neighbor nodes connected to the imaginary failure node through N links on the basis of network topology of the network;

assuming, by the protection path reservation processing unit, the respective selected neighbor nodes in turn as an ingress node of the protection paths and assuming the remaining N−1 neighbor nodes other than the ingress node as egress nodes;

assuming, by the protection path reservation processing unit, the imaginary failure node as a passing prohibition node;

retrieving, by the protection path reservation processing unit, optimum arrival routes from the ingress node to the egress nodes; and defining, by the protection path reservation processing unit, the retrieved optimum arrival routes as routes of the protection paths for the imaginary failure node, the protection paths for the imaginary failure node including only the neighbor nodes of the imaginary failure node wherein the all-optical network transparently transmits an optical signal without converting the optical signal into an electrical signal at a node and also without converting a wavelength of the optical signal.

5. A node unit used for a transmission system provided with a plurality of node units connected to one another via links to form an all-optical network, the node unit comprising:

a self-healing function controller which relieves traffic flowing in transmission paths at the links from failures by using protection paths prepared for the transmission paths; and a protection path reservation processing unit which implements signaling among the plurality of node units to determine routes of the protection paths prepared for the transmission paths, wherein the protection path reservation processing unit:
assumes each of the plurality of node units in turn as an imaginary failure node by means of the signaling in a condition in which a node failure is not present in the network;

selects N neighbor nodes connected to the imaginary failure node through N links by means of the signaling;

sequentially transmits protection path reservation request messages from the imaginary failure node to only the neighbor nodes of the imaginary failure node; and sequentially reserves, one by one, N−1 protection paths at each of the neighbor nodes of the imaginary failure node in descending order of length when receiving the protection path reservation request messages at each of the neighbor nodes;

wherein the node unit transparently transmits an optical signal without converting the optical signal into an electrical signal and also without converting a wavelength of the optical signal.

6. The node unit according to claim 5, reserving the protection paths by means of signaling based on the RSVP-TE (IETF RFC 3209) when receiving the protection path reservation request messages.

7. The node unit according to claim 6, wherein the protection path reservation processing unit stores, in the reservation messages, reservable resource information to be used for preventing resources which have reserved to the imaginary failure nodes from being reserved again to other protection paths corresponding to relevant node failures.

8. A node unit used for a transmission system provided with a plurality of node units connected to one another via links to form an all-optical network that transparently transmits an optical signal, the node unit comprising:

a self-healing function controller which relieves traffic flowing in transmission paths at the links from failures by using protection paths prepared for the transmission paths; and a protection path reservation processing unit which implements signaling among the plurality of node units to determine routes of the protection paths prepared for the transmission paths, wherein the protection path reservation processing unit:
assumes each of the plurality of node units in turn as an imaginary failure node by means of the signaling in a condition in which a node failure is not present in the network;

selects neighbor nodes connected to the imaginary failure node through N links by means of the signaling on the basis of network topology of the network;

assumes the respective selected neighbor nodes in turn as an ingress node of the protection paths, and assumes N−1 neighbor nodes other than the ingress node as egress nodes;

assumes the imaginary failure node as a passing prohibition node;

retrieves optimum arrival routes from the ingress node to the egress nodes; and defines the retrieved optimum arrival routes as routes of the protection paths for the imaginary failure node, the protection paths for the imaginary failure node including only the neighbor nodes of the imaginary failure node;

wherein the node unit transparently transmits the optical signal without converting the optical signal into an electrical signal and also without converting a wavelength of the optical signal.

\* \* \* \* \*

UNITED STATES PATENT AND TRADEMARK OFFICE
CERTIFICATE OF CORRECTION

PATENT NO. : 8,619,551 B2  Page 1 of 1
APPLICATION NO. : 11/651493
DATED : December 31, 2013
INVENTOR(S) : Suzuki et al.

It is certified that error appears in the above-identified patent and that said Letters Patent is hereby corrected as shown below:

In the Claims

Claim 3, column 16, line 54, change "relevant the" to --relevant--.

Signed and Sealed this
Sixth Day of May, 2014

Michelle K. Lee
*Deputy Director of the United States Patent and Trademark Office*